(12) United States Patent
Tazumi et al.

(10) Patent No.: US 6,394,249 B1
(45) Date of Patent: May 28, 2002

(54) ONE-WAY CLUTCH

(75) Inventors: Hajime Tazumi, Higashiosaka; Yoshitaka Nakagawa, Kashiwara; Junya Ooitsu, Kashiwara; Masayuki Kitamura, Toyonaka, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/139,747

(22) Filed: Aug. 25, 1998

(30) Foreign Application Priority Data

Aug. 25, 1997 (JP) .............................................. 9-228187

(51) Int. Cl.$^7$ ................................................. F16D 3/34
(52) U.S. Cl. ..................................... 192/45; 192/107 M
(58) Field of Search ................................ 192/45, 41 R, 192/107 M

(56) References Cited

U.S. PATENT DOCUMENTS

| | | | | |
|---|---|---|---|---|
| 3,388,779 A | * | 6/1968 | Roper | 192/45 |
| 3,625,324 A | * | 12/1971 | Scharf | 192/45 |
| 3,978,949 A | * | 9/1976 | Timtner | 192/41 A |
| 4,549,638 A | * | 10/1985 | Johnston | 192/45 |
| 4,664,237 A | * | 5/1987 | Lederman et al. | 192/45 |
| 4,711,330 A | * | 12/1987 | Lederman | 192/45 |
| 4,724,940 A | * | 2/1988 | Lederman | 192/45 |
| 4,770,054 A | * | 9/1988 | Ha | 74/409 |
| 4,821,856 A | * | 4/1989 | Lederman | 192/45 |
| 4,850,463 A | * | 7/1989 | Lederman | 192/45 |
| 4,901,831 A | * | 2/1990 | Ito et al. | 192/45 X |
| 4,924,981 A | * | 5/1990 | Johnston et al. | 192/45 |
| 5,030,017 A | * | 7/1991 | Murakami et al. | 384/492 |
| 5,074,393 A | * | 12/1991 | Itomi | 192/45 |
| 5,117,954 A | * | 6/1992 | Iga | 192/45 |
| 5,271,486 A | * | 12/1993 | Okamoto et al. | 192/45 |
| 5,398,791 A | * | 3/1995 | Tombers et al. | 192/45 |
| 5,415,258 A | * | 5/1995 | Numata | 192/41 A |
| 5,549,011 A | * | 8/1996 | Shiga et al. | 192/45 X |
| 5,660,647 A | * | 8/1997 | Mitamura et al. | 148/319 |
| 5,672,014 A | * | 9/1997 | Okita et al. | 384/492 |

\* cited by examiner

Primary Examiner—Charles A Marmor
Assistant Examiner—Ha Ho
(74) Attorney, Agent, or Firm—Birch, Stewart, Kolasch & Birch, LLP

(57) ABSTRACT

A one-way clutch for switching a power transmitting state and a power transmission interrupting state between an inner ring member and an outer ring member. At a plurality of circumferential portions of one of the inner ring member and the outer ring member, there are formed cam faces between the circumference of the one of the inner and outer ring members for forming wedge-shaped spaces which are narrowed in one circumferential direction. These cam faces are made to have a higher hardness than that of rollers which are individually arranged in the wedge-shaped spaces. As a result, the cam faces are suppressed from wear as the time elapses, and the wedge angle of the wedge-shaped spaces is kept substantially constant.

8 Claims, 3 Drawing Sheets

ONE-WAY CLUTCH

BACKGROUND OF THE INVENTION

1. Field of the Invention

The present invention relates to a one-way clutch of the type using rollers.

2. Description of the Related Art

In a conventional one-way clutch, cam faces for forming wedge-shaped spaces are usually formed in the inner circumference of an outer ring. This outer ring is made of induction-quenched steel and the rollers are made of bearing steel. It usually follows that the hardness of the cam faces of the outer ring and the hardness of the rollers are substantially equal.

When the aforementioned one-way clutch is used for high-speed rotations, for example, the rollers are repeatedly locked or freed, slipping may occur. With this slipping, over the useable life of the one-way clutch, both the cam faces and the rollers experience significant wear. The continuous progression of wear experienced by the cam faces, the wedge angle of the wedge-shaped spaces, as formed by the cam faces, gradually changes so thus causing a reduction in the clutch function. This reduction in the functionality of the clutch is exemplified by the unstable locked or freed actions.

SUMMARY OF THE INVENTION

Therefore, a main object of the invention is to provide a one-way clutch capable of stabilizing the roller locking and freeing actions for an extented life period of the one-way clutch.

The other objects, features and advantages of the invention will become apparent from the description to be made in the following.

According to the invention, there is provided a one-way clutch comprising: an inner ring member; a plurality of rollers arranged between the inner ring member and an outer ring member; and a retainer arranged between the inner ring member and the outer ring member for retaining the rollers individually, wherein the inner ring member has cam faces formed individually at a plurality of circumferential portions of the outer circumference thereof for forming such wedge-shaped spaces between the outer circumference of the inner ring member and the inner circumference of the outer ring member as are narrowed in one circumferential direction, wherein the rollers are individually arranged in the wedge-shaped spaces, wherein said retainer has a pocket defined therein, said pocket formed by a wall portion having an oblige part which extends therefrom, and wherein the cam faces are made to have a higher hardness than that of the rollers.

Preferably, the one-way clutch may further comprise: pressure members for pushing the rollers to the narrower sides of the wedge-shaped spaces.

Preferably, the retainer has pockets for accommodating the rollers, and the cam faces are formed in the regions corresponding to the pockets.

Preferably, the rollers are made of bearing steel, and the inner ring member, is made of induction-quenched steel including its cam faces and hardened on at least its cam faces to give the cam faces a higher hardness than that of the rollers.

Preferably, the cam faces have an HRC hardness of 65 or more whereas the rollers have an HRC hardness of 60 to 64.

According to the invention, the wear of the cam faces is suppressed even as the use of the one-way clutch progresses over time.

Therefore, the wedge angle of the wedge-shaped spaces can be held substantially constant independent of the extended time of the one-way clutch. If the wear of the rollers should occur, the rollers can be stably locked and freed because their biting actions into the narrower sides of the wedge-shaped spaces are unvaried.

Since the cam faces for forming the wedge-shaped spaces are formed on the outer circumference of the inner ring member, on the other hand, the roller positions are unvaried even if the rotating centrifugal force acts on the rollers to push them onto the inner circumference of the outer ring member. Therefore, the clutch function can be stabilized for a longer time period.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects as well as advantages of the invention will become clear by the following description of preferred embodiments of the invention with reference to the accompanying drawings, wherein.

In all these Figures, like components are indicated by the same numerals.

DETAILED DESCRIPTION OF THE PREFERRED EMBODIMENTS

The invention will be described in connection with its preferred embodiments with reference to the accompanying drawings.

Figure 1:
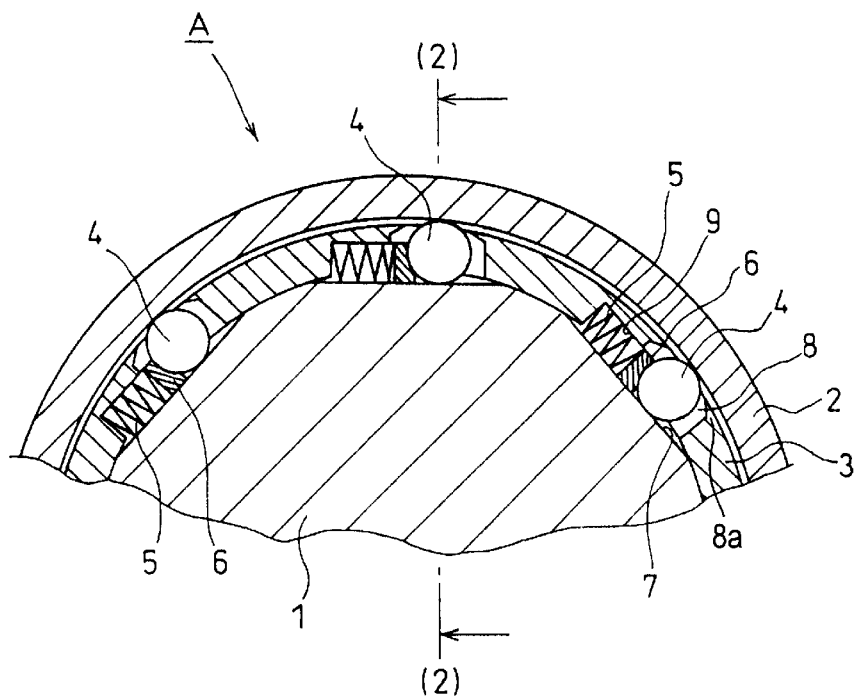
FIG. 1 is a longitudinal section showing one-way clutch according to a first preferred embodiment of the invention.
Figure 2:
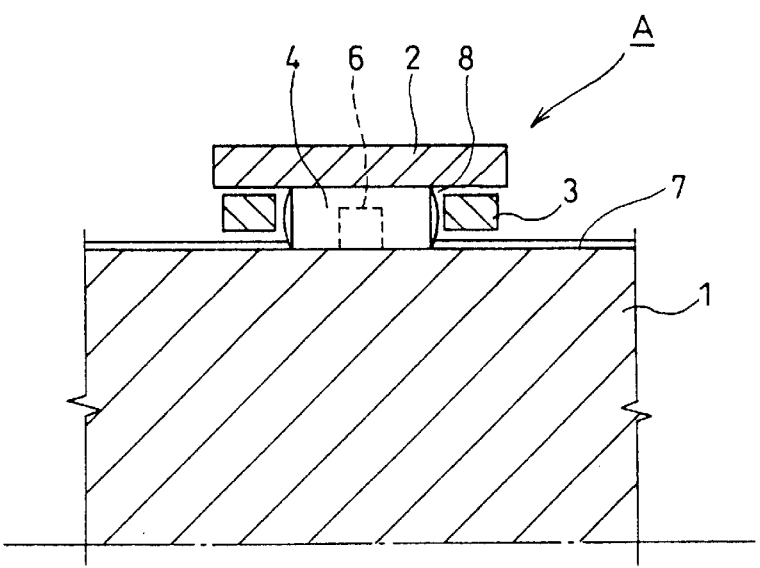
FIG. 2 is a section taken along line (2)—(2) of FIG. 1.
Figure 3:
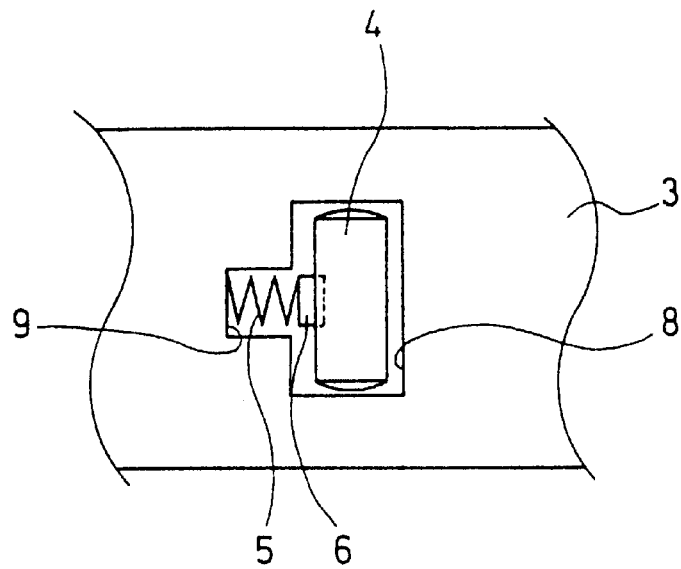
FIG. 3 is an expanded top plan view showing a roller-arranged portion of a retainer of the same embodiment.

Of FIGS. 1 to 3 showing a one-way clutch according to a first preferred embodiment of the invention: FIG. 1 is a longitudinal section showing the one-way clutch; FIG. 1 is a section taken along line (2)—(2) of FIG. 1; and FIG. 3 is an expanded view showing a roller-arranged portion of a retainer.

As shown, a one-way clutch A is constructed to include: a shaft member 1 acting as an inner ring member; an outer ring 2 acting as an outer ring member; a retainer 3; a plurality of rollers 4; coil springs 5 acting as pressure members; and spring receiving members 6. This first embodiment is switched between a state, in which the power is transmitted from the outer ring 2 to the shaft member 1, and a state in which the power transmission is interrupted. Thus, the shaft member 1 is set on the driven side whereas the outer ring 2 is set on the drive side.

The outer ring 2 has a circular formed inner circumference formed. The shaft member 1 is provided at several portions of its outer circumference with cam faces 7 which have flat notches in the axial direction. These cam faces 7 form wedge-shaped spaces between the cam faces 7 and the inner circumference of the outer ring 2 wherein the spaces are narrowed or tapered in one circumferential direction.

The structure having the cam faces 7 formed on the outer circumference of the shaft member 1 is suited for use in a high-speed revolving range which exhibits high centrifugal force, because what acts on the rollers 4 even with the revolving centrifugal force is to push the rollers 4 onto the inner circumference of the outer ring 2 so that all the rollers 4 are stably locked and freed (as will be described hereinafter).

The retainer 3 is provided with pockets 8 for accommodating the rollers 4 one by one in several circumferential portions additionaly, the retainer 3 has recesses 9 for accommodating the coil springs 5 one by one. The pockets 8 are radially extended through the retainer 3. The recesses 9 are open on the side of the shaft member 1 acting as the drive member, i.e., on the radially inner side of the retainer 3 toward the pockets 8 and one axial side thereof.

One coil spring 5 is accommodated in the recess 9 of the retainer 3 such that it is arranged with an offset to the shaft member 1. The coil spring 5 abuts at one end edge thereof through the spring receiving member 6 against the axially center position of the roller 4 and the position, as offset to the shaft member 1, of the PCD (or an abbreviation of "Pitch Circle Diameter") of the roller 4 so that the elastic biasing force thereof can be applied to the roller 4 in a well balanced manner to aid the turns of the roller 4.

The spring receiving member 6 is sandwiched between the coil spring 5 and the roller 4 so that end face thereof on the side of the coil spring 5 is flattened whereas an end face thereof on the side of the roller 4 is curved along the outer circumference of the roller 4. In the presence of the spring receiving member 6, the elastic biasing forces of the coil springs 5 to all the rollers 4 can be made substantially constant independently of the assembly of the coil springs 5. Moreover, the spring receiving member 6 is made, at least its portion thereof abutting against the roller 4, of a synthetic resin having a low coefficient of friction or a material having a self-lubricating property.

Next will be described the actions of the one-way clutch A thus far described.

As the relative rotating speeds between the outer ring 2 and the shaft member 1 change, the roller 4 rolls to the narrower side of the wedge-shaped space into a freely immovable state (or the locked state) or to the wider side of the wedge-shaped space into a freely movable state (or the freed state). As a result, the outer ring 2 and the shaft member 1 are integrated into a synchronous rotating state, or the power transmission between the outer ring 2 and the shaft member 1 is interrupted.

In the one-way clutch A thus far described, the cam face 7 has a higher hardness than that of the roller 4. For example, the shaft member 1 having the cam faces 7 is made of induction-quenched steel (e.g., SAE1065), and the rollers 4 are made of bearing steel (e.g., SUJ2 according to the JIS Standards). The outer circumference of the shaft member 1 including the cam faces 7 is hardened to give the rollers 4 an HRC hardness (i.e., a hardness metered by the Rockwell hardness meter) of 60 to 64, and the cam faces 7 an HRC hardness of 65 or more such as 64 to 67. Here, the hardening treatment is applied to the entire outer circumference of the shaft member 1 but may be selectively applied to the cam faces 7 only. After this hardening treatment, the outer circumference of the shaft member 1 is polished to manage a desired hardness so as to remove the strain which might otherwise accompany the hardening treatment.

If the hardness of the cam faces 7 is set to a higher value than that of the rollers 4, these rollers 4 are more liable to wear than the cam faces 7 as the time elapses. In this embodiment, however, the rollers 4 themselves can be suppressed from the wear because they are set to the desired hardness, as described above. Since the aging wear of the cam faces 7 can be thus suppressed, the wedge angle of the wedge-shaped spaces can be held substantially constant on the life of the one way clutch. If the rollers 4 should wear as the time elapses, their action to bite into the narrower side of the wedge-shaped spaces is unvaried. As a result, the rocked and freed actions of the rollers 4 are stabled over a long time period, thus, providing the long-term stabilization of the clutch function.

Here, the invention should not be limited to the construction thus far described but can be applied and modified in various manners.

Figure 4:
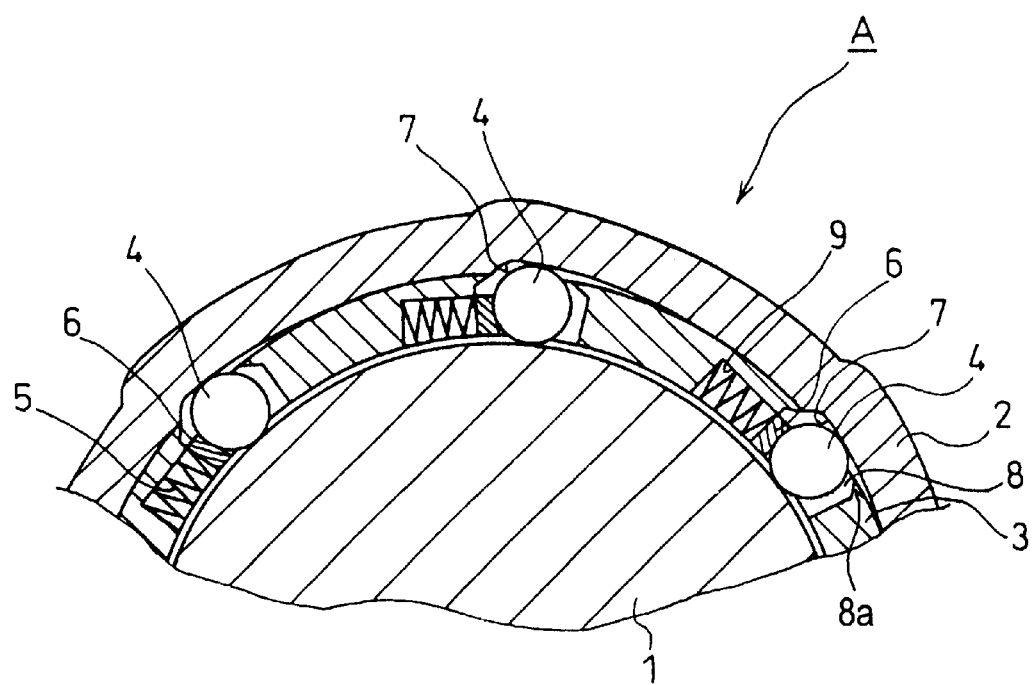
FIG. 4 corresponds to FIG. 1 but shows a second preferred embodiment of the invention.

(1) The first embodiment is exemplified by the one-way clutch A of the type in which the cam faces 7 are formed on the outer circumference of the shaft member 1. However, the invention can also be applied to a one-way clutch A of the type in which the cam faces 7 are formed on the inner circumference of the outer ring 2, as shown in FIG. 4. A second preferred embodiment of the invention, as shown in FIG. 4, is basically identical to that of the first embodiment excepting that the cam faces 7 are formed at a plurality of portions in the inner circumference of the outer ring 2. In this second embodiment, either the entire inner circumference of the outer ring 2 having the cam faces 7 or only the cam faces 7 is set to a higher hardness than that of the rollers 4. As a result, this embodiment can achieve actions and effects substantially similar to those of the foregoing embodiment.

Figure 5:
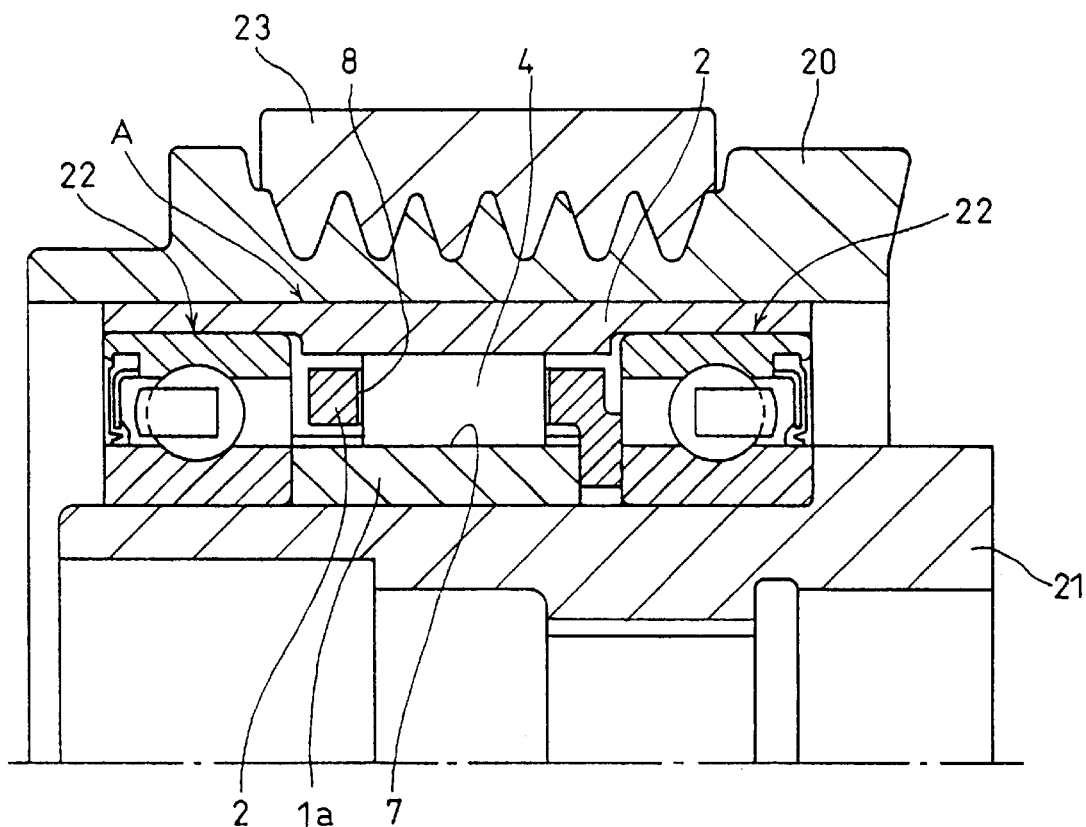
FIG. 5 is a section of an upper half of a pulley unit using the one-way clutch of the invention.

(2) The one-way clutch according to either of the embodiments can be mounted in a pulley of various accessories to be attached to the engine of an automobile. Here will be described the case in which the accessory is exemplified by an alternator, with reference to FIG. 5.

In this example, the one-way clutch A, as shown in FIG. 1, is interposed between a pulley 20 and a rotor shaft 21 of the alternator, and roller bearings 22 and 22 are arranged at the two axial sides of the one-way clutch A. Moreover, the one-way clutch A is provided with cylindrical extensions at the two axial ends of an outer ring 2, and the roller bearings 22 and 22 are sandwiched between the cylindrical extensions and the rotor shaft 21. The shaft member 1 of the one-way clutch A is exemplified by a cylindrical member 1a, which is fitted on the outer circumference of the rotor shaft 21.

In this structure, according to the rotary difference between the pulley 20 and the rotor shaft 21, the one-way clutch A is switched between the freed state and the rocked state to transmit the rotary power from the pulley 20 to the rotor shaft 21 or to interrupt the power transmission. In the ordinary alternator, the pulley 20 is rotationally driven by the crankshaft of the engine through a belt 23. When the number of revolutions the crankshaft falls, for example, the power generation efficiency of the alternator drops. In case the one-way clutch A is mounted, as described above, it has the ability of keeping the number of revolution of the pulley 20 in a high range by the inertial force of the rotor shaft 21 itself when the number of revolution lowers. As a result, the alternator can contribute to an improvement in the power generating efficiency.

Here, the alternator is subjected, depending upon the way the alternator is being used, to frequent repetitions of abrupt accelerations/decelerations. These repetitions may cause slippage of the rollers 4. Even under this situation, the one-way clutch A of the invention can suppress the wear of the cam faces 7, thereby stabilizing the clutch function over the life of the clutch. As a result, the power generation by the alternator can be monitered at an efficient state.

While there has been described what is at presently considered to be the preferred embodiments of the invention, it will be understood that various modifications may be made therein, and it is intended to cover in the appended claims all such modifications which fall within the true spirit and scope of the invention.

What is claimed is:

1. A one-way clutch comprising:
   an inner ring member having a prism body portion;
   a plurality of rollers arranged between said inner ring member and an outer ring member; and
   a retainer arranged between said inner ring member and said outer ring member for retaining said rollers individually,
   wherein said inner ring member has cam faces formed individually at a plurality of flat circumferential positions of the outer circumference thereof, said cam faces forming wedge-shaped spaces between the outer circumference of said inner ring member and the inner circumference of said outer ring member, wherein said wedge-shaped spaces are tapered in one circumferential direction,
   wherein said rollers are individually arranged in said wedge-shaped spaces,
   wherein said retainer has a portion of a pocket defined therein said pocket being further defined by at least a surface of one of said cam faces, a surface of said outer ring member, and a roller receiving wall portion having an oblique part which extends therefrom, and further, said retainer has a recess formed adjacent to said pocket for accommodating a spring, and
   wherein said rollers are made of JIS SUJ-2 bearing steel having an HRC hardness in a range of 60 to 64, said inner ring member is made of induction quenched steel, said cam faces being subjected to a hardening treatment to have an HRC hardness of 65 or more, and an HRC hardness of said inner and outer rings is greater than the HRC hardness level of said rollers thereby ensuring the rollers will wear at a faster rate than said inner and outer rings.

2. A one-way clutch according to claim 1, wherein said cam faces are formed in the regions corresponding to said pockets.

3. The one-way clutch according to claim 1, wherein said oblique part of said roller receiving wall is formed essentially perpendicular to a rest portion of said wall.

4. A one-way clutch according to claim 1, wherein said rings are made of induction-quenched steel having an HRC hardness greater than the hardness of said rollers.

5. A one-way clutch, comprising:
   an outer ring member having a prism body portion;
   a plurality of rollers arranged between an inner ring member and said outer ring member; and
   a retainer arranged between said inner ring member and said outer ring member for retaining said rollers individually,
   wherein:
   said outer ring member has cam faces formed individually at a plurality of flat circumferential positions of the inner circumference thereof, said cam faces forming wedge-shaped spaces between the outer circumference of said inner ring member and the inner circumference of said outer ring member, wherein said wedge-shaped spaces are tapered in one circumferential direction;
   said rollers are individually arranged in said wedge-shaped spaces;
   said retainer has a portion of a pocket defined therein, said pocket being further defined by at least a surface of one of said cam faces, a surface of said inner ring member, and a roller receiving wall portion having an oblique part which extends therefrom, and, further, wherein said retainer has a recess formed adjacent to said pocket for accommodating a spring; and
   said rollers are made of JIS SUF-2 bearing steel having an HRC hardness in a range of from 60–64, said outer ring member is made of induction-quenched steel, said cam faces being subjected to a hardening treatment to have an HRC hardness of 65 or more, and an HRC hardness of said inner and outer ring members is greater than the HRC hardness level of said rollers, thereby ensuring the rollers will wear at a faster rate than said inner and outer ring members.

6. A one-way clutch according to claim 5, wherein said cam faces are formed in the regions corresponding to said pockets.

7. A one-way clutch according to claim 5, wherein said oblique part of said roller receiving wall is formed essentially perpendicular to a rest portion of said wall.

8. A one-way clutch according to claim 5, wherein said rings are made of induction-quenched steel.

* * * * *